United States Patent [19]

Shim

[11] Patent Number: 5,115,312

[45] Date of Patent: May 19, 1992

[54] DOUBLE SCANNING CIRCUIT OF ID-TV

[75] Inventor: U-kyung Shim, Kyungki, Rep. of Korea

[73] Assignee: Samsung Electron Devices Co., Ltd., Rep. of Korea

[21] Appl. No.: 448,692

[22] Filed: Dec. 11, 1989

[30] Foreign Application Priority Data

Dec. 12, 1988 [KR] Rep. of Korea .............. 88-20486[U]

[51] Int. Cl.⁵ .............................................. H04N 7/01
[52] U.S. Cl. ...................................... 358/140; 358/160
[58] Field of Search .......................... 358/140, 160, 11

[56] References Cited

U.S. PATENT DOCUMENTS

| | | | |
|---|---|---|---|
| 4,415,931 | 11/1983 | Dischert | 358/140 |
| 4,509,071 | 4/1985 | Fujimura | 358/140 |
| 4,583,113 | 4/1986 | Prichard | 358/11 |
| 4,630,098 | 12/1986 | Fling | 358/140 |
| 4,723,163 | 2/1988 | Skinner | 358/140 |

*Primary Examiner*—Howard W. Britton

[57] ABSTRACT

A double scanning circuit of improved definition TV (ID-TV) capable for improving resolution of screen and excluding raster by scanning the color signal or the luminance signal of the original signal and the color signal or the luminance signal of the interpolation signal by double speed sequentially. The invention relates to inputting an original signal S1 and an interpolation signal S2 of 8 bits to the line memories through 3-state buffer circuit blocks and 3-state transceiver circuit blocks, and an original signal S1 and an interpolation signal S2 are inputted in said line memories and outputted alternately through a multiplexer, so that double scanning is realized. The present invention provides the effects of doubling the resolution of the screen and also excluding the raster of screen.

4 Claims, 1 Drawing Sheet

DOUBLE SCANNING CIRCUIT OF ID-TV

BACKGROUND OF THE INVENTION

The present invention relates to a double scanning circuit of ID-TV (improved definition TV), and more particularly, to a double scanning circuit of ID-TV capable for improving the resolution of the screen and for eliminating raster by scanning the original color signal or the luminance signal and the color signal or the luminance signal of the interpolation signal sequentially with double speed.

Inasmuch as conventional color TV processes an analog signal for operating the TV, the screen is scanned by selecting an interlaced scanning method in the form of three colors, R.G.B., in accordance with the luminance Y signal and color C signal which are outputted through respective filters.

However, according to such conventional processing method, the raster is outstandingly displayed as for televisions of larger sizes, and there is the disadvantage that resolution is rapidly lowered.

Particularly, since the raster is displayed as much as a degree capable of being recognized by human eyesight, there is the problem that a sense is conveyed of the scene having fallen down and eyesight fatigue is further increased.

SUMMARY OF THE INVENTION

Therefore, the present invention is intended to solve such a problem as described above, and it is an object of the present invention to provide a double scanning circuit of ID-TV capable of improving the resolution of the screen by scanning the color signal or the luminance signal of the original signal and the color signal or the luminance signal of the interpolation signal sequentially with double speed by utilizing the line memory without employing an interlaced scanning method and processing a double scanning circuit by the digital signal of NTSC broadcasting method.

In order to accomplish the above object, the present invention comprises an original signal S1 and an interpolation signal S2 of 8 bits which are inputted to line memories through 3-state buffer circuit blocks and 3 state tranceiver circuit blocks, and original signal S1 and interpolation signal S2 inputted to said line memories are outputted alternately through multiplexers so that double scanning can be realized.

The forgoing and other objects as well as the advantages of the present invention will become clear by the following description of the invention with reference to the accompanying drawings.

BRIEF DESCRIPTION OF THE DRAWING

For a better understanding of the invention, and to show how the same may be carried out into effect, reference will now be made, by way of example, with respect to the accompanying drawings, in which.

DETAILED DESCRIPTION OF THE INVENTION

Figure 1:
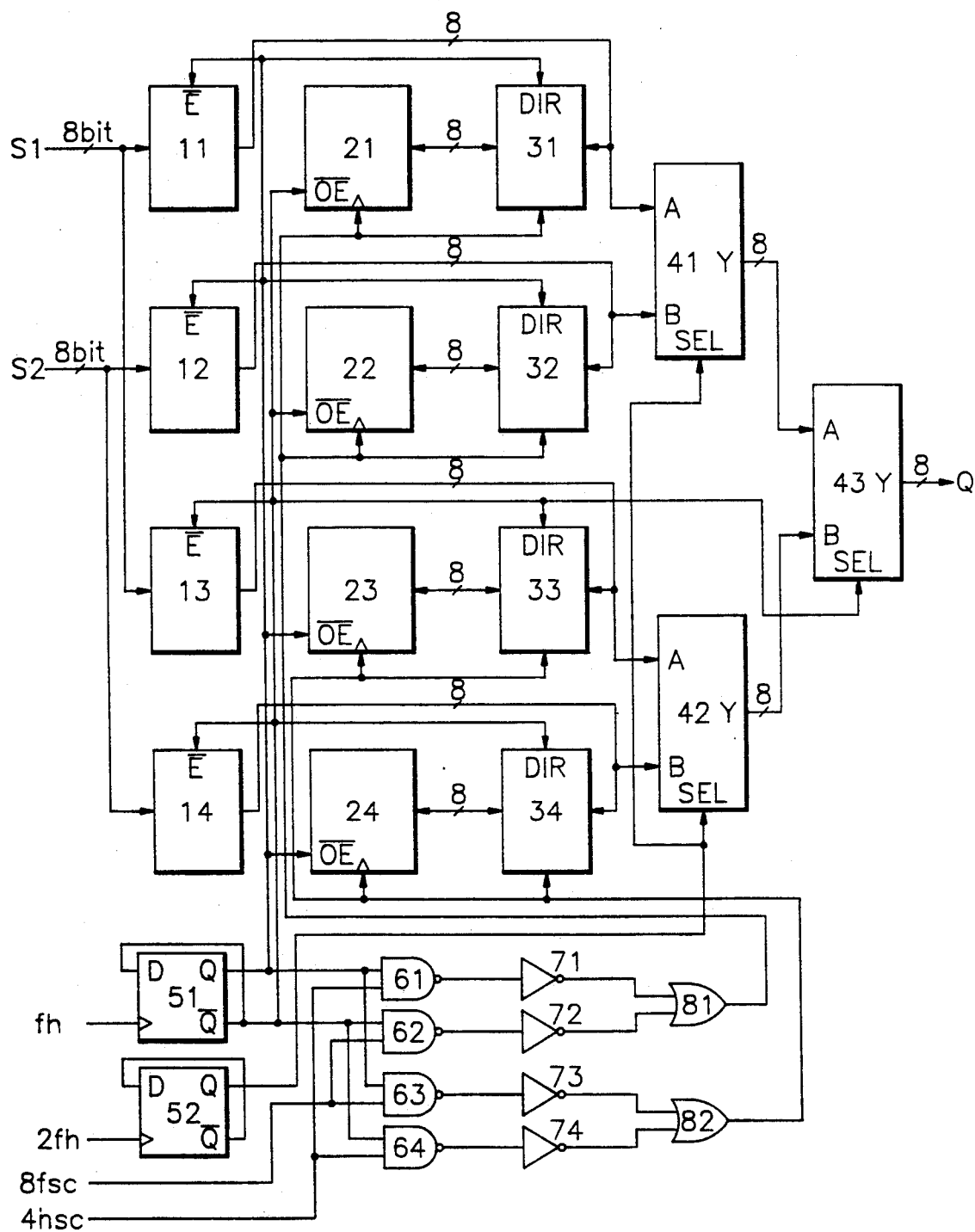
FIG. 1 is a block diagram of the present invention.

Hereinafter, a preferred embodiment of the present invention will be described in detail with reference to the accompanying drawing.

FIG. 1 shows a block diagram of a preferred embodiment of the present invention which is wired so that a color signal and a luminance signal of an original signal S1 of 8 bits are applied to 3-state buffer circuits 11 and 13. The invention is further wired so that a color signal and a luminance signal of an interpolation signal S2 of 8 bits are applied to 3-state buffer circuit blocks 12 and 14, and further wired so that as a horizontal frequency fh of 15.75 KHz and 31.5 KHz 2 fh are applied to flipflops 51 and 52.

One output Q of flipflop 51 is connected to each of the enable terminals $\overline{Es}$ of 3-state buffers 11, 12 and to each of the read and write terminals $\overline{QEs}$ of the line memories 23, 24 as well as to each of the terminals DIRs of 3-state tranceiver circuit blocks 31, 32 and also to each of the one side terminals of the NAND gates 61, 63; and another inverted output $\overline{Q}$ of flipflop 51 is fed back and connected to the data input terminal D of flipflop 51, at the same time, being connected to each enable terminals $\overline{Es}$ of said 3-state buffer circuit blocks 13, 14, each read and write terminals $\overline{QEs}$ of line memories 21, 22, each terminals DIRs of 3-state tranceiver circuits 33, 34 as well as to each one side terminals of NAND gates 62, 64.

Further, frequency 8 fsc of 28.6 MHz is connected to another respective side of the terminals of said NAND gates 61,63, and frequency 4 fsc of 14.3 MHz is connected to another respective side of the terminals of said NAND gates 61, 64, and passing through two inverters 71, 74, respectively and the output of one OR gate 82 of two is connected to each clock terminals of said 3-state tranceiver circuit blocks 33, 34 and said line memories 23, 24, and the output of another OR gate of two is connected to each clock terminals of said 3-state tranceiver circuit blocks 31, 32 and said line memories 21, 22, while each of said line memories 21 to 24 and each of said 3-state tranceiver circuit blocks 31 to 34 ar connected to each other.

One output Q of said flipflop 52 is connected to each of the select terminals SELs of 2×1 multiplexers 41, 42, and the outputs of said 3-state buffer circuit blocks 11 to 14 are respectively connected to said DIR terminals of said 3-state tranceiver circuit blocks 31 to 34 as well as to each input terminals A, B of said multiplexers 41, 42, while each of two of the outputs 'Y's of said multiplexers 41, 42 are connected respectively to each inputs A, B of another multiplexer 43 so that output signal $\overline{Q}$ is alternately outputted with the original signal S1 and the interpolation signal S2, and the inversion terminal Q of said flipflop 52 is connected to the select terminal SEL of said multiplexer 43.

The operation and the effect of the above present invention will be described in detail hereinafter.

FIG. 1 shows a double scanning circuit of an ID-TV according to the present invention, which is a circuit for converting from that of operating by interlaced scanning with a basic horizontal frequency of 15.75 KHz to a sequential scanning of 31.5 KHz, that is composed by using line memories.

A color signal and a luminance signal of the original signal S1 are written to the lime memories 21, 23 for one horizontal period through 3-state buffer circuit blocks 11, 13 and 3-state tranceiver circuit blocks 31, 33, and a color signal and a luminance signal of the interpolation signal S2 are written to the line memories 22, 24 for said one horizontal period through 3-state buffer circuit blocks 12, 14 and 3-state tranceiver circuit blocks 32, 34.

At this moment, said two signals S1, S2 are also alternately written to line memories 21 to 24 by utilizing outputs Q, $\overline{Q}$ of the flipflop 51.

This is the case when the output of said flipflop 51 is applied to the respective terminals $\overline{OE}$s of line memories 21 to 24, when "high" signal is applied $\overline{OE}$s, executing writing operation, and when "low" signal is applied to each $\overline{OE}$s, executing reading operation.

The writing operation and the reading operation are executed through 3-state tranceiver circuit blocks 31 to 34. The clock frequency at this time is selected with a frequency 4 fsc of 14.3 MHz. This signal is used as a clock of said line memories 21 to 24 and 3-state tranceiver circuit blocks 31 to 34 which pass through the NAND gates 61, 64, inverters 71, 74 and OR gates 81, 82.

The writing operation is outputted by executing for one period of clock of 4 fsc through said 3-state tranceiver circuit blocks 31 to 34 and the reading operation is outputted by executing for one period of clock of 8 bits fsc, wherein double scanning is realized.

Here, the difference as compared to conventional double scanning circuit is that of executing double speed scanning together with the original signal S1 by using the interpolation signal S2, where at this moment, the clock frequency for the double speed scanning is selected with a frequency 8 fsc of 28.6 MHz.

Further, the data selection of said original signal S1 and interpolation signal S2 is selected by multiplexers 41, 42 and thereafter are outputted through another multiplexer 43.

The selection control signal of said multiplexers 41 to 43 utilizes flipflop 52 output signal Q of frequency 2 fh, at the same time, utilizing the inversion output $\overline{Q}$ of said flipflop 51.

The write and read operations of said line memories are now described in detail. When the data is written in a state where the terminal $\overline{OE}$ signal is applied with a "high" signal, the clock frequency receives a frequency 4 fsc of 14.36363 MHz so that data is stored, and in the case where data is read in a state where said terminal $\overline{OE}$ signal is applied with a "low" signal, so that the clock frequency receives a frequency 8 fsc of 28.63636 MHz so that the date is outputted.

Thus when the line memories 21, 22 among said line memories read original signal S1 and the interpolation signal S2, line memories 23, 24 execute writing operation for original signal S1 and interpolation signal S2, the two signals S1, S2 are alternately scanned by double speed with two frequencies 4 fsc and 8 fsc to carry out the read and write operations.

On the other hand, the TTL gate uses a gate operating at a high frequency of 30 MHz and the speed is fast. It does not matter if either one of said two signals S1, S2 are used by double speed scanning of the color signal C and the luminance signal Y.

As described above, the present invention, in the circuit for processing the broadcasting signal to digital signal, is effective by utilizing the line memories and processing the original signal and the interpolation signal by double speed scanning during the time of the read and write operations so that the resolution of the screen is doubled, and also effectively excludes the raster of screen by this double speed scanning process.

I claim:

1. A double scanning circuit ID-TV for executing broadcasting signal by digital double speed process, comprising:
   logic gates;
   line memories adapted to receive a color signal, said line memories including at least two line memories for receiving said color signal during writing operation by means of a first frequency clock having a frequency, supplied by said logic gates and said line memories; and
   said line memories other than said at least two line memories being adapted to receive double speed scanning alternatively during reading operation by a frequency clock having a frequency twice that of said first frequency clock.

2. A double scanning circuit of ID-TV according to claim 1 further comprising 3-state tranceiver circuit blocks and wherein data during reading and writing operation of said line memories are organized to be executed through said 3-state tranceiver circuit blocks.

3. A double scanning circuit of ID-TV according to claim 1 further comprising flipflops having complimentary outputs having a frequency of said first frequency clock, said line memories including terminals wherein reading and writing operations of said line memories are organized by controlling the terminals of said line memories.

4. A double scanning circuit of ID-TV according to claim 2 further comprising flipflops having complimentary outputs having a frequency of said first frequency clock, said line memories including terminals wherein reading and writing operations of said line memories are organized by controlling the terminals of said line memories.

* * * * *